United States Patent
Takada et al.

(10) Patent No.: US 7,141,311 B2
(45) Date of Patent: Nov. 28, 2006

(54) FERRITE THIN FILM FOR HIGH FREQUENCY AND METHOD FOR PREPARATION THEREOF

(75) Inventors: Jun Takada, Okayama (JP); Tatsuo Fujii, Okayama (JP); Makoto Nakanishi, Okayama (JP)

(73) Assignee: Japan Science and Technology Agency, Saitama (JP)

( * ) Notice: Subject to any disclaimer, the term of this patent is extended or adjusted under 35 U.S.C. 154(b) by 255 days.

(21) Appl. No.: 10/416,506

(22) PCT Filed: Nov. 21, 2001

(86) PCT No.: PCT/JP01/10193

§ 371 (c)(1),
(2), (4) Date: Nov. 4, 2003

(87) PCT Pub. No.: WO02/42214

PCT Pub. Date: May 30, 2002

(65) Prior Publication Data
US 2004/0075075 A1  Apr. 22, 2004

(30) Foreign Application Priority Data
Nov. 21, 2000 (JP) ............................. 2000-355065

(51) Int. Cl.
*B32B 15/01* (2006.01)

(52) U.S. Cl. ...................... 428/669; 428/670; 428/672; 428/673; 428/692.1; 427/131

(58) Field of Classification Search ...................... None
See application file for complete search history.

(56) References Cited

U.S. PATENT DOCUMENTS

| 4,188,594 A | * | 2/1980 | Bongianni | 332/129 |
| 4,243,697 A | * | 1/1981 | Glass et al. | 427/547 |
| 4,816,292 A | * | 3/1989 | Machida | 427/539 |

FOREIGN PATENT DOCUMENTS

| JP | 58-164 | 1/1983 |
| JP | 58-31643 | 7/1983 |
| JP | 6-115934 | 4/1994 |

(Continued)

OTHER PUBLICATIONS

JPO Abstract Translation of JP 2000-173812-A (JPO Doc-ID: JP 2000173812 A).*

(Continued)

*Primary Examiner*—Kevin M. Bernatz
(74) *Attorney, Agent, or Firm*—Westerman, Hattori, Daniels & Adrian, LLP.

(57) ABSTRACT

The present invention provides a Y-type hexagonal ferrite thin film suitable for high frequency devices, having a crystal structure with the c-axis oriented perpendicular to the surface of the thin film. The present invention also provides a method of producing the Y-type hexagonal ferrite thin film, comprising the steps of preparing a viscous solution containing a metal-organic complex which is formed using a primary component including a $Fe^{+3}$ ion, and a secondary component including a $Ba^{2+}$ ion, at least one transition metal ion selected from the group consisting of $Fe^{2+}$, $Co^{2+}$, $Ni^{2+}$, $Zn^{2+}$, $Cu^{2+}$ and $Mn^{2+}$; and optionally at least one metal ion selected from the group consisting of $Sr^{2+}$, $Ca^{2+}$ and $Pb^{2+}$, forming a film having a Y-type ferrite composition on a surface made of noble metal through a coating process using the viscous solution, and burning the film at a temperature of 750° C. or more.

8 Claims, 9 Drawing Sheets

FOREIGN PATENT DOCUMENTS

JP          2000-173812 A    *    6/2000

OTHER PUBLICATIONS

Machine Translation of JP 09-205031-A.*
Zuo, X., How, H., Shi, P., Oliver, S., Vittoria, C., IEEE TRans. Mag., 37(4), Jul. 2001, 2395-2397.*
Nakagawa, S., Matsushita, N., Naoe, M., J. Mag. Mag. Mat., 235, Oct. 2001, 337-341.*
Patent Abstracts of Japan, Publication No. 9-124322, dated May 13, 1997.
Patent Abstracts of Japan, Publication No. 9-129433, dated May 16, 1997/Discussed in the specification.
Patent Abstracts of Japan, Publication No. 2000-235916, dated Aug. 29, 2000/Discussed in the specification.
Patent Abstracts of Japan, Publication No. 9-205031, dated Aug. 5 1997/Discussed in the specification.
Hu Guoguang et al., J. Magn. Mater Devices, vol. 30, No. 1, pp. 36-38.

* cited by examiner (A)

(a) lower coil　　　(b) magnetic film　　　(c) forming upper coil
　　　　　　　　　　(etching to form　　　　to provide product
　　　　　　　　　　ring-shaped film)

(B)

5 μm

FERRITE THIN FILM FOR HIGH FREQUENCY AND METHOD FOR PREPARATION THEREOF

TECHNICAL FIELD

The present invention relates to a ferroxplana-type hexagonal ferrite thin film capable of obtaining a high magnetic permeability in the high frequency range of high-frequency communication devices or the like, and a production method thereof.

BACKGROUND ART

Heretofore, cubic spinel-type ferrites as represented by Mn—Zn ferrite have been used in high frequency devices by taking advantage of their high magnetic permeability. However, upon use in frequencies of several hundred MHz, the permeability of the cubic spinel-type ferrites is sharply deteriorated due to their Snoek's limit, and the effectiveness as material for high-frequency devices will disappear. Among hexagonal ferrites, a ferroxplana-type ferrite with the c-plane having a high magnetizability is expected as noteworthy material for high frequency devices to be used in higher frequency range, because it can maintain a high magnetic permeability up to several GHz beyond the Snoek's limit of cubic spinel-type ferrites. The ferroxplana-type ferrite has a typical composition of $Ba_2Zn_2Fe_{12}O_{22}$ or $Ba_3Co_2Fe_{24}O_{41}$. There have also been known more complicated compositions such as a composition including $SiO_2$ and CaO in addition to the above composition (Japanese Patent Laid-Open Publication No. H09-129433) or $Ba_3Co_2(M_x, N_x)Fe_{24-2x}O_{41}$ (M: divalent metal ion such as Zn, Cu or Co; N: quadrivalent metal ion such as Ti, Zr, Hf, Si, Ge, Sn or Ir; x: 3 or less; Japanese Patent Laid-Open Publication No. 2000-235916). These hexagonal ferrites have been used as powder material for a sintered body (Japanese Patent Laid-Open Publication No. H09-129433) or powder paste for a coated layer (Japanese Patent Laid-Open Publication No. H09-205031).

Recently, in connection with advance of information and communications apparatuses such as portable phones and personal computers, downsizing and increase in signal frequency of electronic devices have been accelerated, which leads to the need for developing high-frequency electronic devices such as a filter or inductor available in higher frequency range with more downsized structure. As a recent trend in downsizing, in view of the limit of a traditional approach of 3-dimensionally downsizing a bulk device, a planer device effective to downsizing and integration is actively developed by utilizing a technology of laminating thin films. However, despite of the strong need in small devices, no technology of forming a thin film using a ferroxplana-type ferrite has been successfully developed.

As shown in FIG. 1, a hexagonal ferrite has M-type, U-type, W-type, X-type, Y-type and Z-type phases, and these phases have different solid-solution ranges, respectively. In addition, the crystal structure in each of the phases is extremely complicated as illustrated in FIG. 2. Thus, while there have been reported many cases of the formation of M-type ($BaFe_{12}O_{19}$) thin films which is binary system and has perpendicular magnetic anisotropy, none of the formation of other type hexagonal ferrite thin films has been reported. The M-type hexagonal ferrite is a magnetoplumbite-type ferrite having uniaxial anisotropy, and is thereby used for quite different purposes from those of other type hexagonal ferrites. Therefore, the need for developing a technology of forming a Y-type hexagonal ferrite thin film usable in high frequency devices strongly exists.

SUMMARY OF THE INVENTION

As a result of various researches for solving the above problem, the inventors has found that a thin film of Y-type hexagonal ferrite belonging to ferroxplana-type ferrites can be produced through a method of forming a film on a noble metal surface by use of a viscous solution containing a metal-organic complex.

Specifically, the present invention provides a Y-type hexagonal ferrite thin film having a Y-type ferrite composition and a crystal structure with the c-axis oriented perpendicular to the surface of the thin film, wherein the thin film is formed on the surface of a substrate made of noble metal, or the surface of a noble metal layer provided on a substrate made of insulating or semiconducting material.

The present invention also provides a method of producing the above Y-type hexagonal ferrite thin film. This method comprises the steps of preparing a viscous solution containing a metal-organic complex which is formed using a primary component including a $Fe^{+3}$ ion, and a secondary component including a $Ba^{2+}$ ion and at least one transition metal ion selected from the group consisting of $Fe^{2+}$, $Co^{2+}$, $Ni^{2+}$, $Zn^{2+}$, $Cu^{2+}$ and $Mn^{2+}$, forming a film having a Y-type ferrite composition on a surface made of noble metal, by use of the viscous solution, and burning the film. The secondary component may further include at least one metal ion selected from the group consisting of $Sr^{2+}$, $Ca^{2+}$ and $Pb^{2+}$.

In this method, the preparing step may include the step of adding organic acid and polyol to a solution of material prepared using water-soluble compounds containing Ba, Zn and Fe as starting materials to form the metal-organic complex constituting the viscous solution, wherein the viscous solution is formed as a film having a composition of Y-type $Ba_2Zn_2Fe_{12}O_{22}$ on the surface made of noble metal and then burnt.

In the method, the burning step may be performed at a temperature of 750° C. or more to obtain the above Y-type hexagonal ferrite thin film.

In the present invention, the composition of the Y-type hexagonal ferrite thin film having a crystal structure with the c-axis oriented perpendicular to the surface of the thin film is typically expressed by a general formula $Ba_2Me_2Fe_{12}O_{22}$ (Me: at least one transition metal selected from the group consisting of Ni, Co, Zn, Cu and Mn). Alternatively, the Y-type hexagonal ferrite thin film may have a composition formed by substituting Ba in the above basic composition with at least one metal selected from the group consisting of Sr, Ca and Pb, or a more complicated Y-type hexagonal Ba ferrite composition formed by adding a small amount of various elements, such as B, Si or Mg, at any position in the above basic composition.

Heretofore, a solid-phase bulk Y-type ferrite has been burnt at about 1000° C. By contrast, in the method of the present invention, a film having a Y-type ferrite composition is formed on a surface made of noble metal to allow a Y-type hexagonal ferrite thin film having a crystal structure with the c-axis oriented perpendicular to the surface of the thin film to be obtained at a lower burning temperature. If the surface is made of $Al_2O_3$, the reaction between the ferrite and $Al_2O_3$ will preclude any thin film formation. If the surface is made of quartz ($SiO_2$), no Y-type hexagonal ferrite thin film can be obtained because a formed film will be solid-solved in $SiO_2$.

BRIEF DESCRIPTION OF THE DRAWINGS

FIG. 3 illustrates a process of producing a tiny planar device using a Y-type hexagonal ferrite thin film having a crystal structure with the c-axis oriented perpendicular to the surface of the thin film, wherein FIG. 3(A) is a top plan view, and FIG. 3(B) is a side view.

DESCRIPTION OF THE PREFERRED EMBODIMENT

Figure 1:
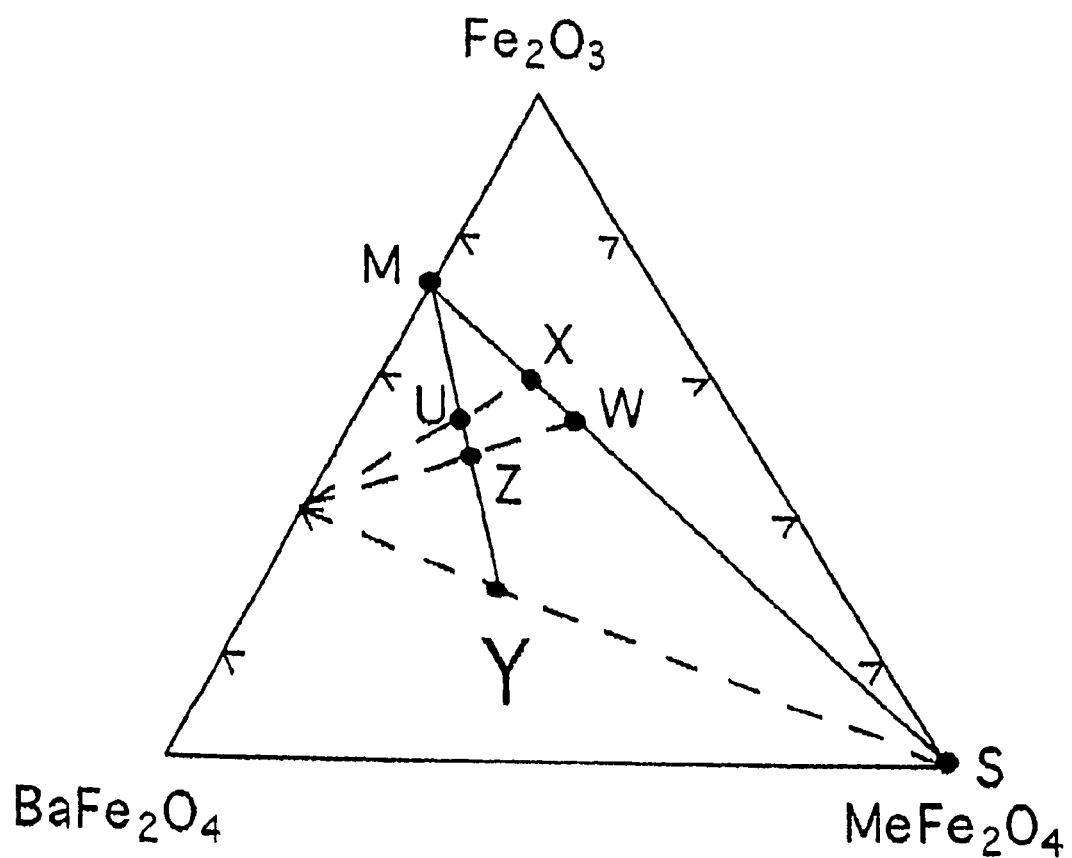
FIG. 1 is a phase diagram of hexagonal ferrites.
Figure 2:
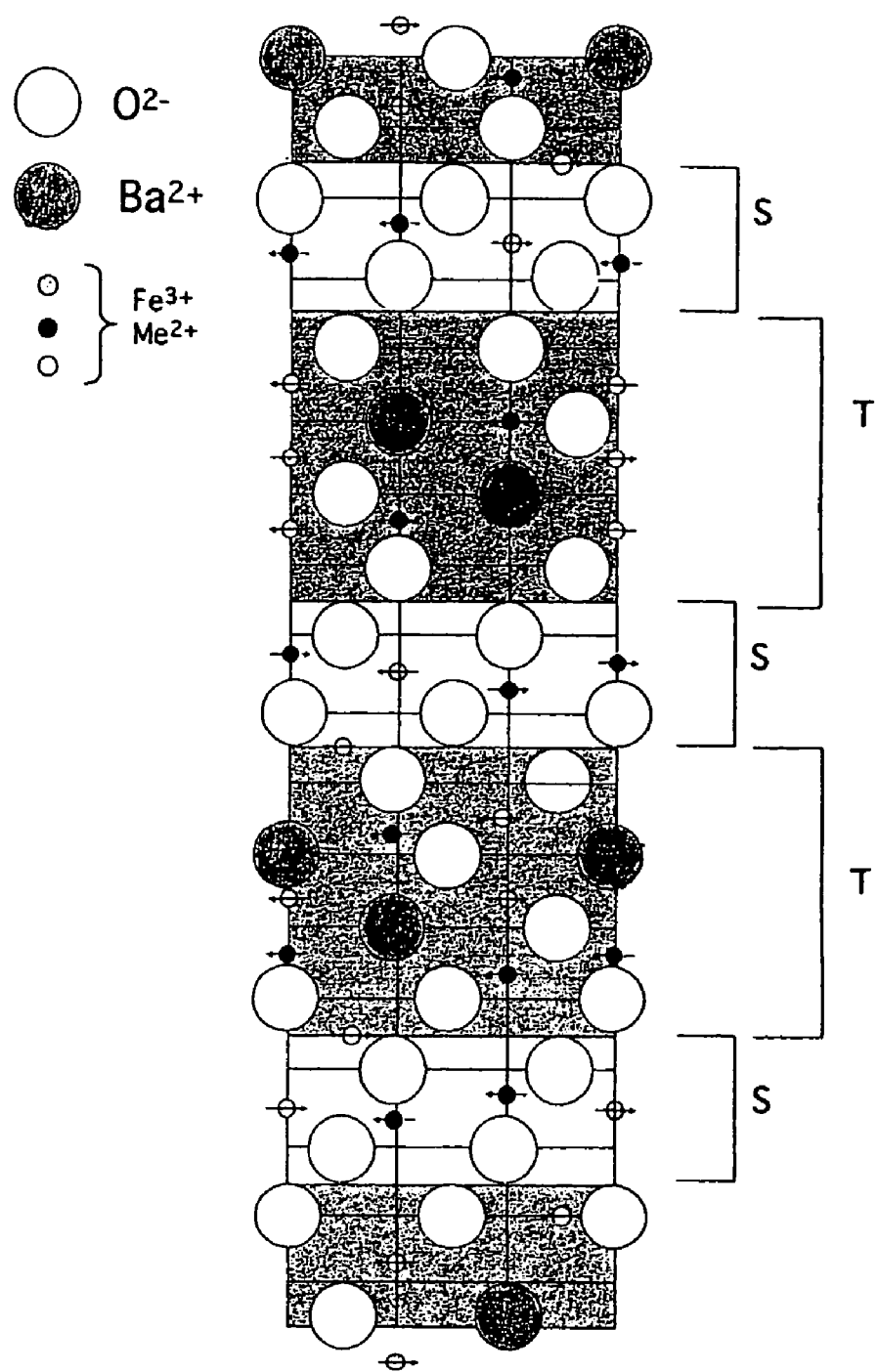
FIG. 2 is a schematic diagram showing the atomic arrangement of a Y-type hexagonal Ba ferrite.

A method of producing a Y-type hexagonal ferrite thin film having a crystal structure with the c-axis oriented perpendicular to the surface of the thin film, according to the present invention, will now be described in detail.

Firstly, a viscous solution containing a metal-organic complex formed using a stating material capable of supplying a $Fe^{+3}$ ion as a primary component, another kind of divalent transition metal ion, a $Ba^{2+}$ ion, and optionally a $Sr^{2+}$, $Ca^{2+}$ or $Pb^{2+}$ ion is prepared. The term "viscous solution" means a glutinous or sticky liquid, and more specifically an aqueous fluid in the form that a polymeric metal-organic complex is transparently and homogeneously dispersed in a solution such as water, acetic acid or ethanol.

This viscous solution may be prepared through (1) a process of slowly concentrating an initial water solution added with the starting material while gradually vaporizing the water in the solution until it has a desired viscosity, or (2) a process of vaporizing the entire water in an initial water solution added with the starting material to obtain a gel metal-organic complex, and then dissolving the gel metal-organic complex in a solvent such as water, acetic acid, or ethanol to provide a solution having a desired viscosity.

As a specific example, a so-called metal complex polymerization process may be preferably used to prepare the viscosity solution. In the complex polymerization process, organic acid, such as citric acid, and diol, such as ethylene glycol, propylene glycol or butane diol, or any other suitable polyol, are added to a water solution which contains a starting material, such as metal carbonate, metal hydroxide, metal sulfate, metal carboxylate or metal halogenide, dissolved therein to provide a given ferrite composition, and then the obtained mixture is dehydrated and condensed to crosslink the metal ions with each other through the organic matters so as to form an metal-organic complex.

The metal complex polymerization process itself is a known technology for homogeneously dispersing metal ions through complexifization of the metal ions using citric acid and formation of a 3-dimensional network using ethylene glycol. More specifically, a stable chelate complex is first formed between citric acid and plural kinds of metal ions. Then, the chelate complex is dispersedly dissolved in ethylene glycol, and the obtained solution is copolymerized and esterified under heating to form an oligomer and finally form a polymer gel having a 3-dimensional network structure or a complex polymerization. The complex polymerization process is used in manufacturing a complex oxide such as superconducting material.

The obtained polymer gel as a precursor has a significantly stable network structure primarily formed through ester bonding or copolymerization. Thus, the mobility of the metal ions is drastically reduced to allow ceramic particles to be formed directly therefrom with a desired composition in a subsequent process.

As compared to a sol-gel process using alcoxide as material, the metal complex polymerization process has advantages of enhanced homogeneity in metal-ion dispersion, and lower cost in material. Further, when the metal complex polymerization process is used to produce a multinary thin film, the enhanced homogeneity in dispersion of metal-ion can be advantageously maintained until a burning step by virtue of the 3-dimensional network of the polymer. Any suitable conventional coating or printing process, such as a dip coating or spin coating process, may be used to form a film. Preferably, in each process of applying the polymer gel, the thickness of a film to be applied is set in the range of about 80 to 100 nm. If it is required to increase the film thickness, the processes of film formation, drying, polymerization and thermal decomposition may be repeated.

In the dip coating process, after immersion into a coating liquid, a substrate is taken out of the coating liquid upward, and subjected to a treatment for gelatinizing the liquid film deposited on the surface of the substrate. The dip coating process has various advantages of no need for expensive large-scale facility as in a chemical vapor deposition process, availability for any size of a substrate, simple operation, and applicability in producing a multinary thin film.

As a pretreatment of the surface made of Ag, Au, Pt or other metal of the platinum family, on which a film having a composition of Y-type ferrite is formed, it is desired to rinse the surface of an oxide layer formed on the surface of the noble metal naturally or due to thermal oxidation, with a basic water solution such as KOH to modify the surface of the oxide layer completely by an OH group. Alternatively, the surface of the oxide layer may be simply rinsed with distilled water or hydrophilic liquid such as ethanol to obtain substantially the same effect. In case of Ag, even if its surface is briefly rinsed, it allows a ferrite film to adequately deposited thereonto because an Ag oxide layer is naturally formed thereon in the atmosphere. In case of Au or Pt, almost no oxide layer is naturally formed on its surface. Thus, it is preferable to heat the surface under oxygen atmosphere or irradiate the surface with oxygen plasma so as to positively form an oxide layer on the surface to provide sufficient wettability of a viscous solution during coating process or enhanced deposition of a film. The Ag, Au, Pt or other metal of the platinum family may contain any alloy element as long as an intended function of its surface is not lost.

While the above noble metal has a cubic close-packed crystal structure, its surface can have an elongated directional microstructure due to rolling or scratch. In this case, the crystal orientation in a Y-type hexagonal ferrite thin film can be enhanced by coating a film in a direction perpendicular to the direction of the microstructure rather than coating it in parallel thereto.

The conventional bulk device has a limit in 3-dimensional reduction in size, e.g. minimum thickness of about 3 mm or minimum radius of 2.5 mm, due to its structure composed of a plurality of separated components. By contrast, a Y-type hexagonal ferrite thin film of the present invention can be used to provide a device having a desired shape by coating a Y-type ferrite film on a surface made of noble metal while placing on the surface a mask with an opening corresponding to the desired shape, or by forming the Y-type hexagonal ferrite thin film over the surface and partially removing the thin film with etching to allow the remaining thin film to have the desired shape.

Figure 3:
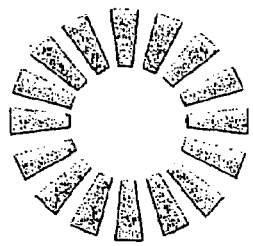
Figure 3:
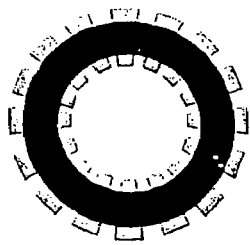
Figure 3:
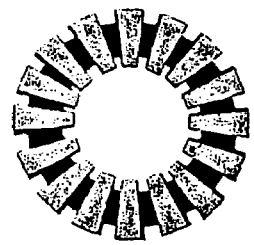
Figure 3:
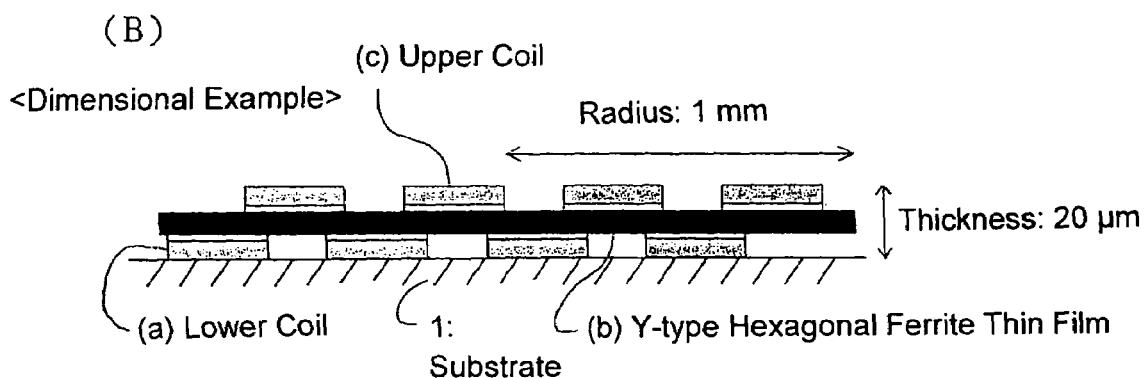

For example, as shown in FIG. 3, a significantly downsized planar device having a thickness of about 20 μm and a radius of about 1 mm by forming a lower coil (a) having a surface layer made of one noble metal selected from the group consisting of Ag, Au, Pt and other metal of noble metal family, on a substrate 1 made of insulating or semi-conducting material such as $Al_2O_3$ or Si, forming the Y-type hexagonal ferrite thin film (b) of the present invention on the surface layer, etching the thin film (b) to leave a ring-shaped thin film, and forming an upper coil (c) on the ring-shaped thin film.

In the method of the present invention, when the film having the Y-type ferrite composition is burnt after formed on the surface made of noble metal, the crystal orientation in a Y-type hexagonal ferrite thin film to be obtained is deteriorated as the burning temperature is reduced. Thus, in either noble metal constituting the surface, the burning temperature should be set at 750° C. or more to assure an enhanced in-plane crystal orientation in the obtained thin film. The burning temperature of less than 750° C. precludes the formation of the intended Y-type hexagonal ferrite thin film having a crystal structure with the c-axis oriented perpendicular to the surface of the thin film, and the crystal orientation will be enhanced as the burning temperature is increased.

The upper limit of the burning temperature is preferably set at 900° C. for the surface made of Ag (melting point: 960.8° C.), or at 1300° C. for the surface made of Pt (melting point: 1769° C.), or at 1000° C. for the surface made of Au (melting point: 1063° C.). In the surface made of Ag or Au, upon exceeding the upper limit, the burning temperature gets close to their melting point, and the smoothness of the obtained thin film is sharply deteriorated. In the surface made of Pt, at a temperature exceeding the upper limit, the ferrite itself in the coated film is partially molten and decomposed. It is particularly preferable to use Ag as the material of the surface, because the burning temperature for the surface made of Ag is set less than the melting point (962° C.) of a silver wire for use as electrical leads to allow silver wire to be burned together with the coated film. In view of the situation where high frequency devices generally employ a silver wire in their circuit, the Y-type hexagonal Ba ferrite thin film formed on the surface made of Ag is a significantly effective material for high frequency devices.

EXAMPLE

Example 1

Starting materials, $BaCO_3$, $ZnCO_3$ and $FeCl_3.6H_2O$ were weighted to have their ratio of 1:1:6, and put in a beaker. On the basis of the total mol number of the starting materials, 70-time mol of distilled water, 3.75-time mol of citric acid, and 11.25-time mol of ethylene glycol were added to the starting materials to form a metal complex.

The obtained viscous solution was heated at 90° C. by a hot stirrer, and concentrated. After the stirrer is completely stopped, the obtained gel was diluted by adding 2 parts of acetic acid on the basis of the weight of the gel. A pure Ag substrate (0.20×10×10 mm, available from Nilaco Co.) is dipped in the viscous solution prepared in the above way, and taken out of the viscous solution upward at a constant speed to form a film coated on the surface of the Ag substrate. The coated film was subjected sequentially to drying at 90° C. for 1 hour, polymerization at 190° C. for 1 hour, and thermal decomposition at 410° C. for 1 hour. In the above process, when the substrate was taken out of the viscous solution upward at a constant speed of 43.7 mm/min, a coated film had a thickness of about 1000 Å. Then, the substrate with the coated film was burnt at various temperatures.

Figure 4:
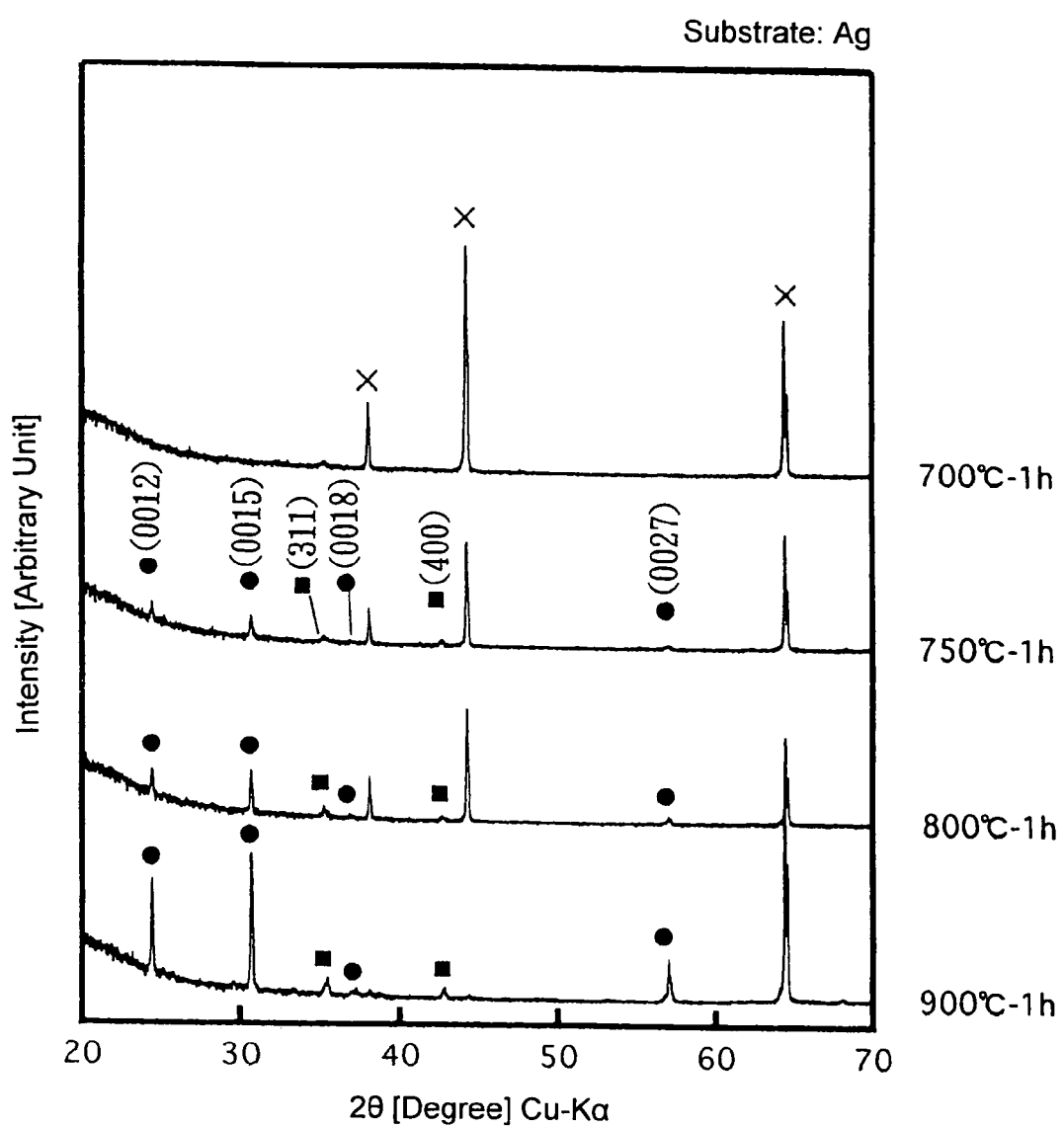
FIG. 4 is a graph showing the XRD pattern of a thin film produced in EXAMPLE 1.

The obtained thin film was evaluated by identifying the created phase using XRD, measuring the magnetization using VSM, observing the surface of the thin film using SEM, determining the magnetization phase through Moessbauer spectroscopy, and measuring the thickness of the thin film. The XRD pattern of the produced thin film is shown in FIG. 4. A Y-type peak appeared in the thin film burnt at 900° C. for 1 hour. In addition, despite of Ag having a cubic crystal structure, all of the obtained Y-type peaks were oriented in the direction of (001) plane.

Figure 5:
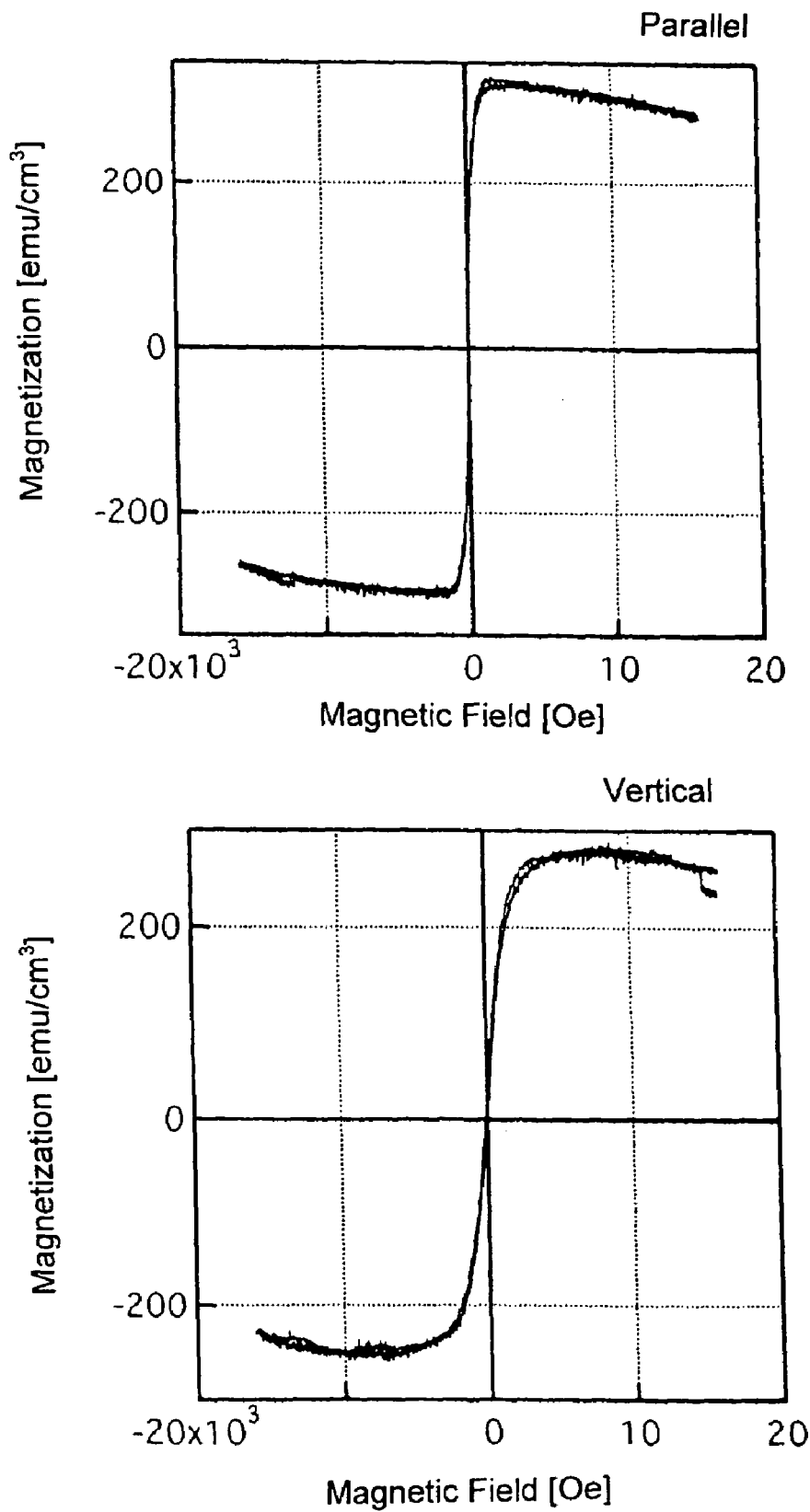
FIG. 5 is a graph showing the magnetization curve of the thin film produced in EXAMPLE 1.
Figure 6:
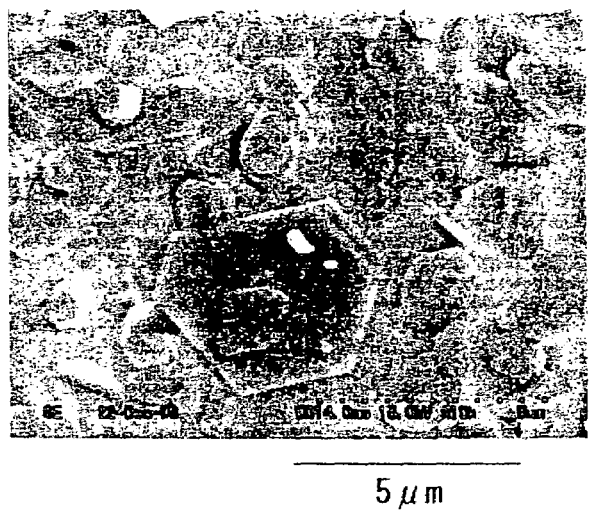
FIG. 6 is a photographic representation of the SEM image of the thin film produced in EXAMPLE 1.

The magnetization curves of the above thin film are shown in FIG. 5. As compared to the hysteresis curve obtained by applying a magnetic field in the vertical direction of the thin film, the hysteresis curve obtained by applying a magnetic field in the in-plane direction of the thin film has a sharper rising, and consequently a smaller coercivity. That is, the produced thin film has high in-plane magnetizability. The SEM image of the thin film is shown in FIG. 6. Hexagonal plate-shaped grains observed in FIG. 6 prove the creation of a hexagonal crystal structure.

Example 2

Figure 7:
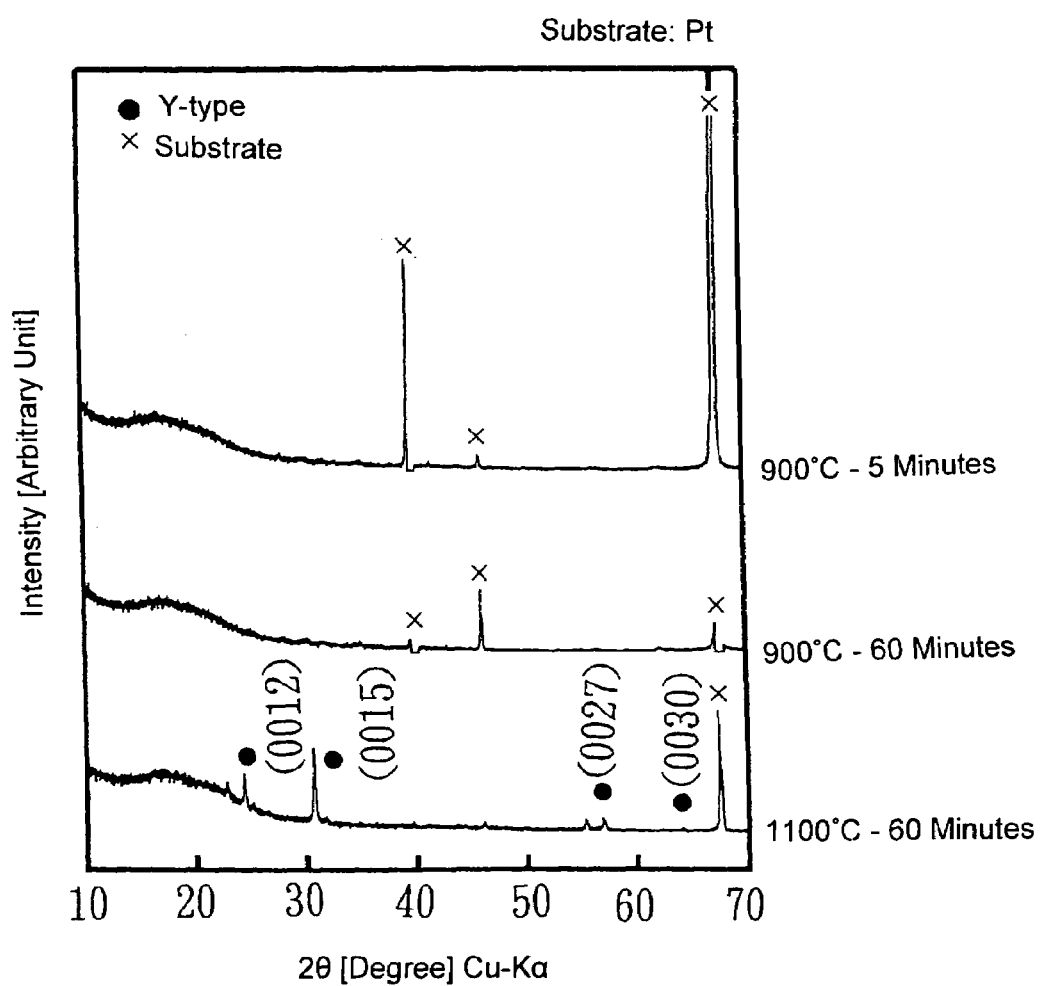
FIG. 7 is a graph showing the XRD pattern of a thin film produced in EXAMPLE 2.

A thin film was produced under the same conditions as those in EXAMPLE 1 except for using a pure Pt substrate (0.20×10×10 mm, available from Nilaco Co.) and coating a film on the surface of the Pt substrate. The XRD pattern of the produced thin film is shown in FIG. 7. When a surface made of Pt was used, a Y-type peak appeared in the produced thin film burnt at 1100° C. for 1 hour. In addition, despite of Pt having a cubic crystal structure, all of the obtained Y-type peaks were oriented in the direction of (001) plane.

Figure 8:
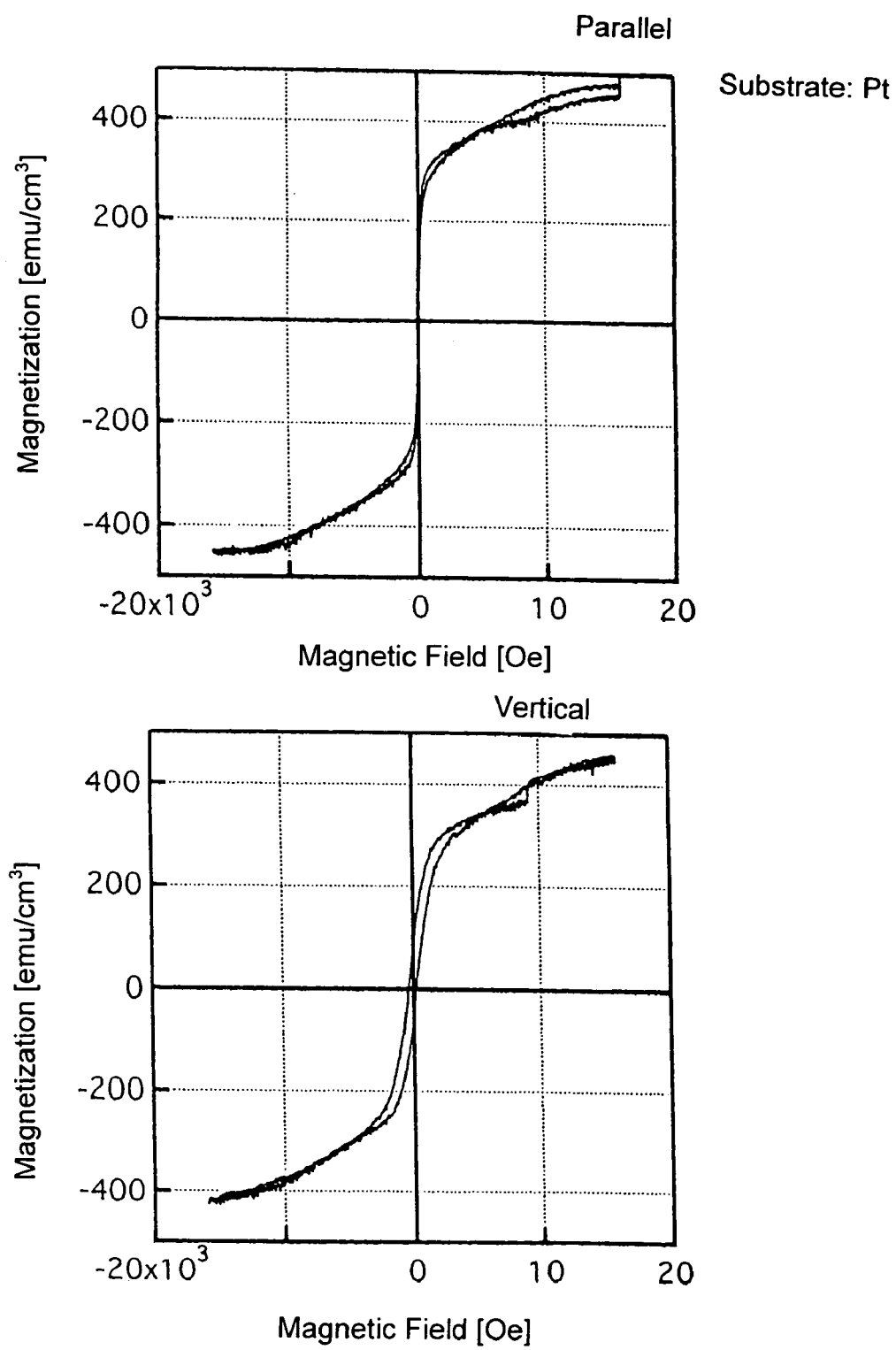
FIG. 8 is a graph showing the magnetization curve of the thin film produced in EXAMPLE 2.

The magnetization curves of the above thin film are shown in FIG. 8. As compared to the hysteresis curve obtained by applying a magnetic field in the vertical direction of the thin film, the hysteresis curve obtained by applying a magnetic field in the in-plane direction of the thin film has a sharper rising, and consequently a smaller coercivity. That is, the produced thin film has high in-plane magnetizability.

Comparative Example 1

Figure 9:
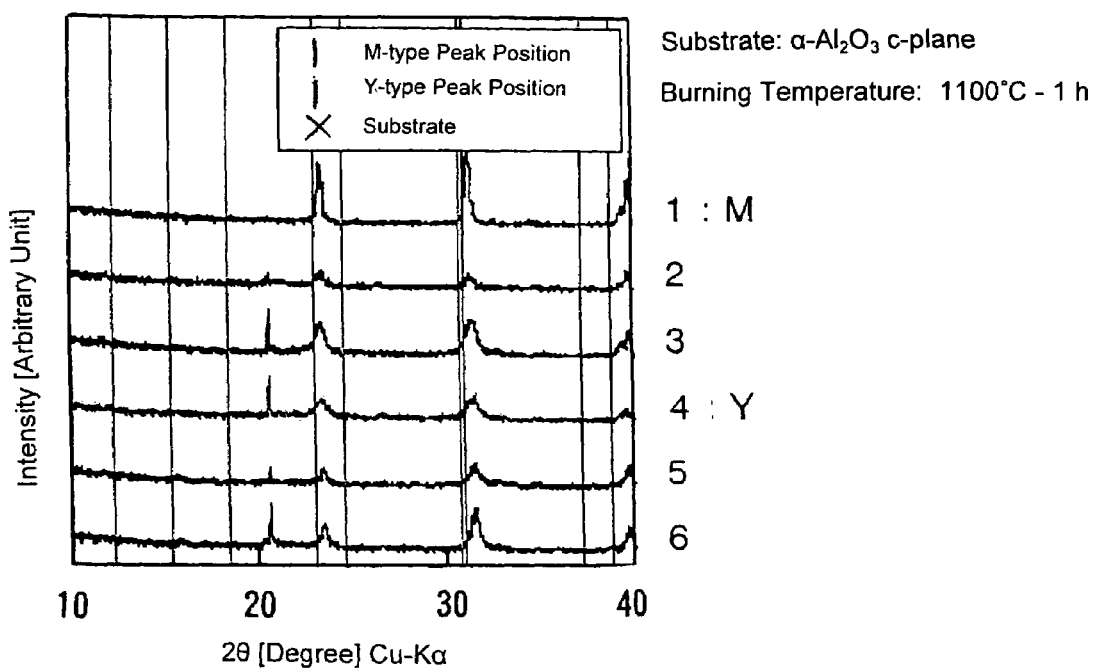
FIG. 9 is a graph showing the XRD pattern on an M-type-Y-type line of a thin film produced in COMPARATIVE EXAMPLE 1.
Figure 10:
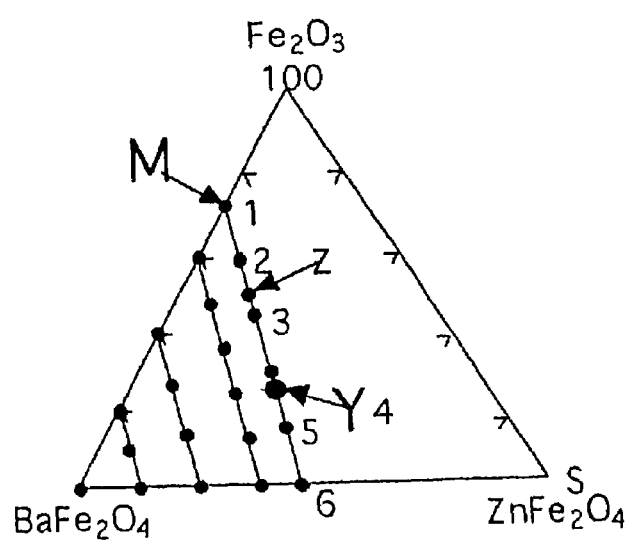
FIG. 10 is a phase diagram showing the composition of the thin film produced in COMPARATIVE EXAMPLE 1.

A thin film was produced under the same conditions as those in EXAMPLE 1 except for using a α-Al$_2$O$_3$ c-plane substrate and coating a film on the surface of the Al$_2$O$_3$ substrate. A coated film was burnt at 1100° C. for 30 minutes. The XRD pattern on an M-type-Y-type line of the produced thin film is shown in FIG. 9, and the composition of the produced thin film is plotted on a phase diagram in FIG. 10. When α-Al$_2$O$_3$ c-plane was used as a surface, only peaks of the thin film reacted with the substrate appeared. While an M-type Ba ferrite phase could be observed in all of the compositions of the produced thin film as shown in FIG. 9, no Y-type phase could be created.

Comparative Example 2

Figure 11:
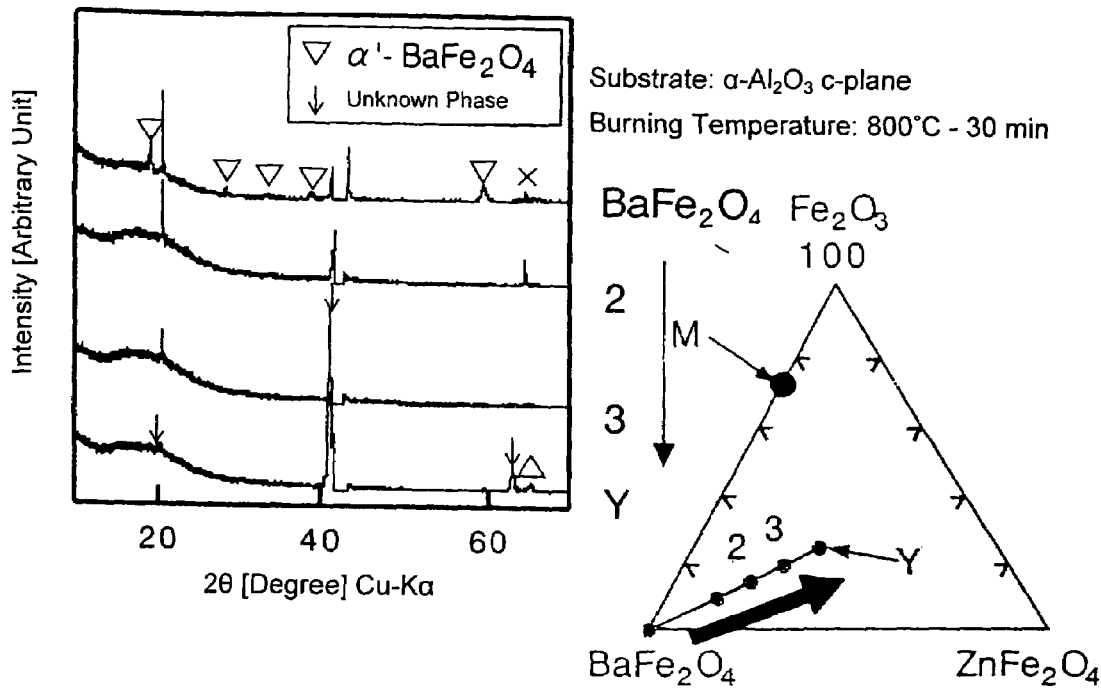
FIG. 11 is a graph showing the XRD pattern on a $BaFe_2O_4$-Y-type line of a thin film produced in COMPARATIVE EXAMPLE 2.
Figure 12:
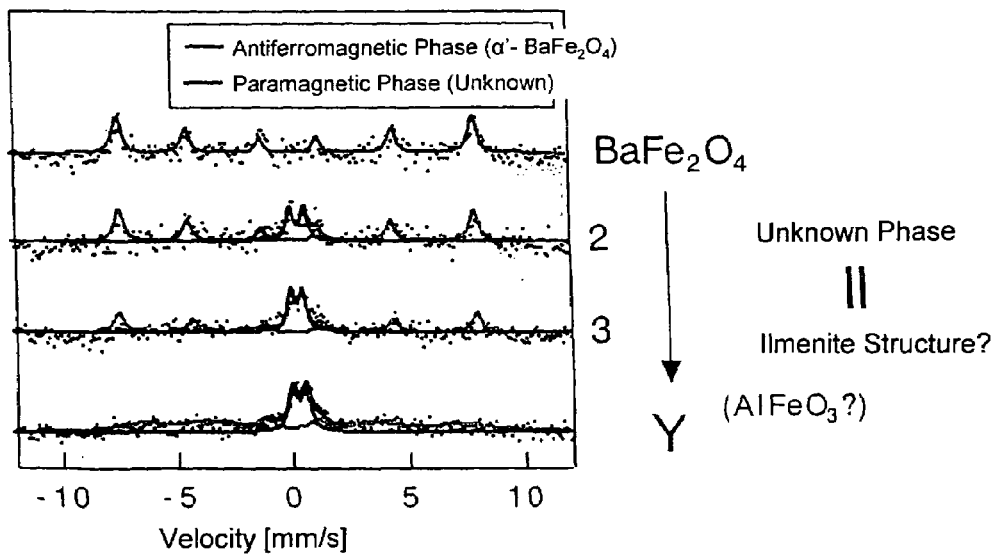
FIG. 12 is a graph showing the Moessbauer spectrum on a $BaFe_2O_4$-Y-type line of the thin film produced in COMPARATIVE EXAMPLE 2.

In COMPARATIVE EXAMPLE 1, there is a possibility that Zn having a low melting point was released outside the phases. Thus, a coated film under the same conditions as those in EXAMPLE 1 was burnt at a lower temperature of 1000° C. In this case, a previously unknown phase appeared. In view of the peak of this unknown phase exhibited at a position close to a hexagonal α-Al$_2$O$_3$ substrate and the burning temperature, it can be assumed that the unknown phase is also hexagonal α'-BaFe$_2$O$_4$. The XRD pattern on a BaFe$_2$O$_4$-Y-type line of the produced thin film is shown in FIG. 11. As seen in FIG. 11, an unknown phase appeared in the composition having Zn. FIG. 12 is the Moessbauer spectrum on a BaFe$_2$O$_4$-Y-type line of the produced thin film. A peak in the composition of BaFe$_2$O$_4$ shows only an antiferromagnetic phase, which results from α'-BaFe$_2$O$_4$.

However, the peak of the antiferromagnetic phase goes down and the peak of a paramagnetic phase goes up as the composition gets close to Y-type. It is believed that the paramagnetic phase is a compound (AlFeO$_3$) similar to an ilmenite structure created through the reaction between Fe in the components of the coated film and Al in the components of the substrate. Through this example, it was proved that the intended thin film cannot be obtained using the α-Al$_2$O$_3$ substrate due to the reaction between the coated film and the substrate.

INDUSTRIAL APPLICABILITY

The Y-type hexagonal ferrite thin film of the present invention is useful as material for high-frequency electronic devices such as a filter or inductor available in higher frequency range.

What is claimed is:

1. A Y-type hexagonal ferrite magnetic thin film composite, comprising:
    a thin film of in-plane magnetizability including Y-type ferrite, c-axis of crystal structure of said Y-type ferrite being oriented perpendicular to a surface of said thin film, and
    a substrate with a surface consisting of noble metal, said thin film being directly formed on the surface consisting of noble metal.

2. The Y-type hexagonal ferrite magnetic thin film composite as defined in claim 1, wherein the substrate with a surface consisting of noble metal comprises a substrate made of noble metal.

3. The Y-type hexagonal ferrite magnetic thin film composite as defined in claim 1, wherein the substrate with a surface consisting of noble metal comprises:
    a substrate made of insulating or semiconducting material; and
    a noble metal layer provided on the substrate made of insulating or semiconducting material.

4. A high frequency device comprising:
    a Y-type hexagonal ferrite magnetic thin film composite comprising:
        a thin film of in-plane magnetizability including Y-type ferrite, c-axis of crystal structure of said Y-type ferrite being oriented perpendicular to a surface of said thin film, and
        a substrate with a surface consisting of noble metal, said thin film being directly formed on the surface consisting of noble metal.

5. A method of producing the Y-type hexagonal ferrite thin film composite as defined in claim 1 or 4, comprising the steps of:
    preparing a viscous solution containing a metal-organic complex which is formed using a primary component including a Fe$^{+3}$ ion, and a secondary component including a Ba$^{2+}$ ion and at least one transition metal ion selected from the group consisting of Fe$^{2+}$, Co$^{2+}$, Ni$^{2+}$, Zn$^{2+}$, Cu$^{2+}$ and Mn$^{2+}$;
    forming a film having a Y-type ferrite composition on a surface made of noble metal, by use of said viscous solution; and
    burning said film.

6. The method as defined in claim 5, wherein said secondary component further includes at least one metal ion selected from the group consisting of Sr$^{2+}$, Ca$^{2+}$ and Pb$^{3+}$.

7. The method as defined in claim 5, wherein said preparing step includes the step of adding organic acid and polyol to a solution of material prepared using water-soluble compounds Ba, Zn and Fe as a starting material to form said metal-organic complex constituting said viscous solution, wherein said viscous solution is formed as a film having a composition of Y-type Ba$_2$Zn$_2$Fe$_{12}$O$_{22}$ on said surface made of noble metal and then burnt.

8. The method as defined in claim 5, wherein said burning step is performed at a temperature of 750° C. or more.

* * * * *